United States Patent [19]

Kimura et al.

[11] Patent Number: 5,315,510
[45] Date of Patent: May 24, 1994

[54] ELECTRONIC CASH REGISTER INDICATING WHEN CASH IS REQUIRED TO BE COLLECTED FROM THE CASH DRAWER

[75] Inventors: Yoshiharu Kimura; Akihiro Kikuchi, both of Shizuoka, Japan

[73] Assignee: Tokyo Electric Co., Ltd., Tokyo, Japan

[21] Appl. No.: 875,347

[22] Filed: Apr. 29, 1992

[30] Foreign Application Priority Data

May 13, 1991 [JP] Japan .................. 3-107284

[51] Int. Cl.⁵ .......................................... G06F 15/21
[52] U.S. Cl. ............................................ 364/405
[58] Field of Search ........................ 364/405; 402/23; 235/375, 377, 378, 379

[56] References Cited

U.S. PATENT DOCUMENTS

| | | | |
|---|---|---|---|
| 4,186,439 | 1/1980 | Shimura et al. | 364/405 |
| 4,399,508 | 8/1983 | Nakatani | 364/405 |
| 4,564,904 | 1/1986 | Kumagai | 364/405 |
| 4,752,874 | 6/1988 | Meyers | 364/405 |
| 4,829,429 | 5/1989 | Komai et al. | 364/405 |

FOREIGN PATENT DOCUMENTS

| | | |
|---|---|---|
| 55-123765 | 9/1980 | Japan . |
| 56-35259 | 6/1981 | Japan . |
| 58-123154 | 7/1983 | Japan . |
| 61-120989 | 7/1986 | Japan . |
| 63-35184 | 3/1988 | Japan . |
| 63-122885 | 8/1988 | Japan . |

*Primary Examiner*—Roy N. Envall, Jr.
*Assistant Examiner*—A. Bodendorf
*Attorney, Agent, or Firm*—Frishauf, Holtz, Goodman & Woodward

[57] ABSTRACT

An electronic cash register includes a cash drawer, a memory for storing upper limits of the total amount of cash to be received in the cash drawer for different periods of time, and a processing section for generating total amount data indicating the total amount of cash stored in the cash drawer, comparing the generated total amount data with the upper limit of the total cash amount set for the current time and generating a warning to require the collection of cash when the total amount data is equal to or larger than the upper limit of the total cash amount.

16 Claims, 8 Drawing Sheets

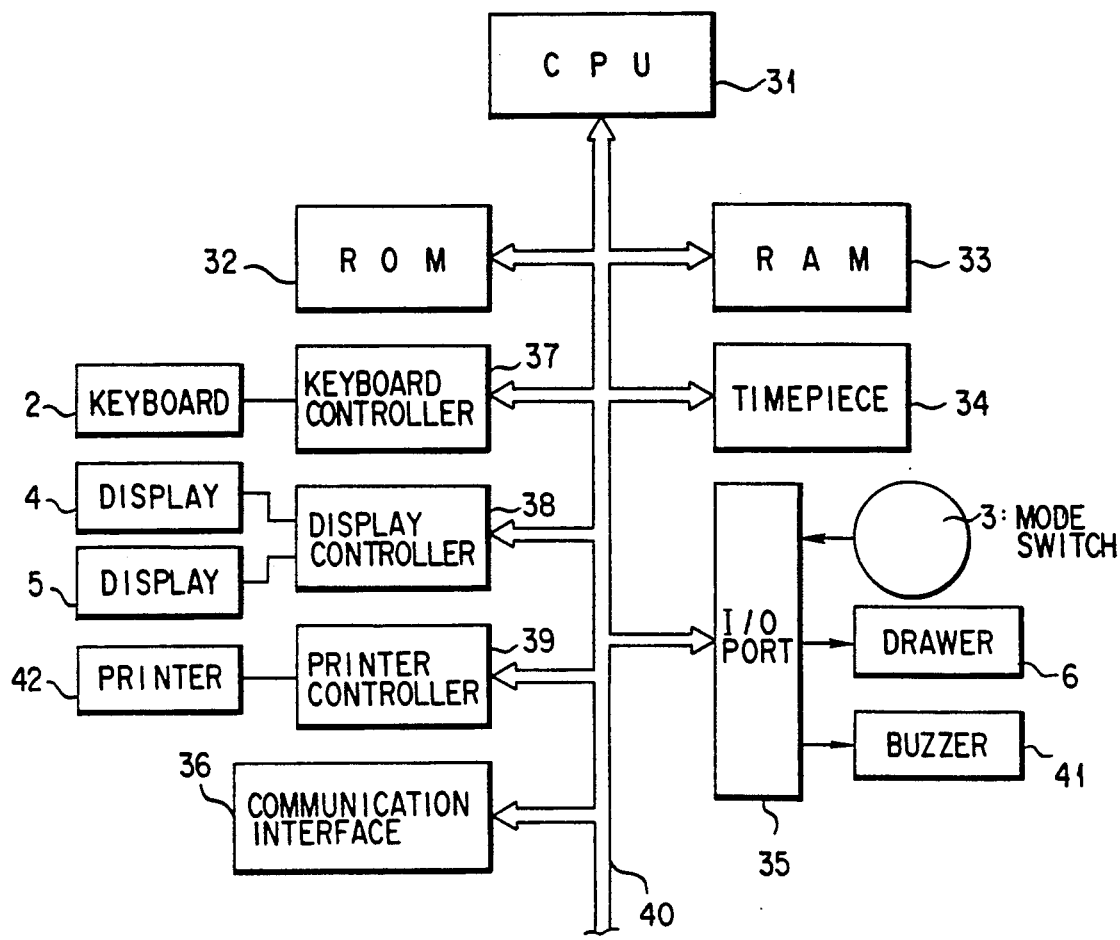
F I G. 3

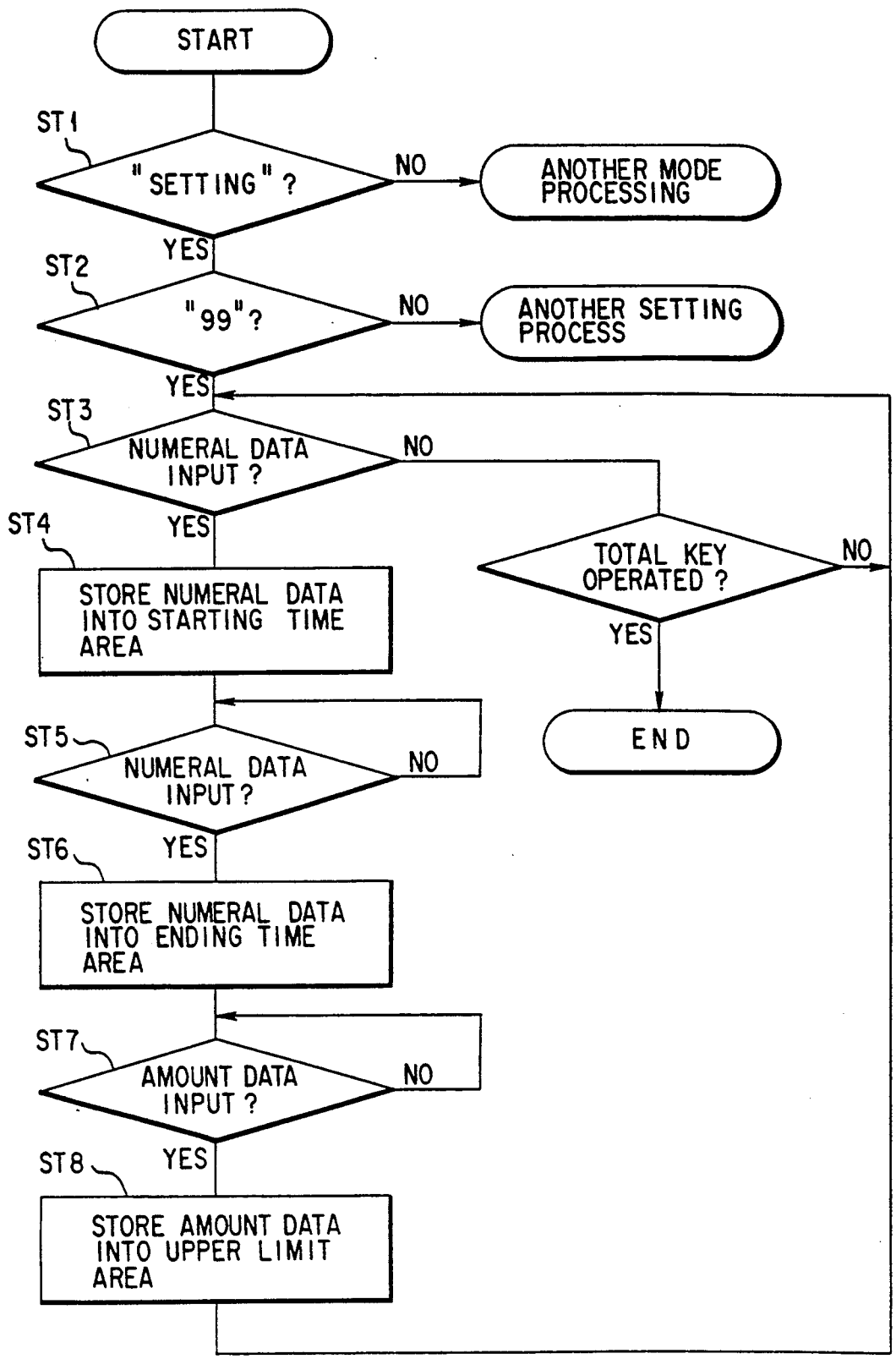
F I G. 5

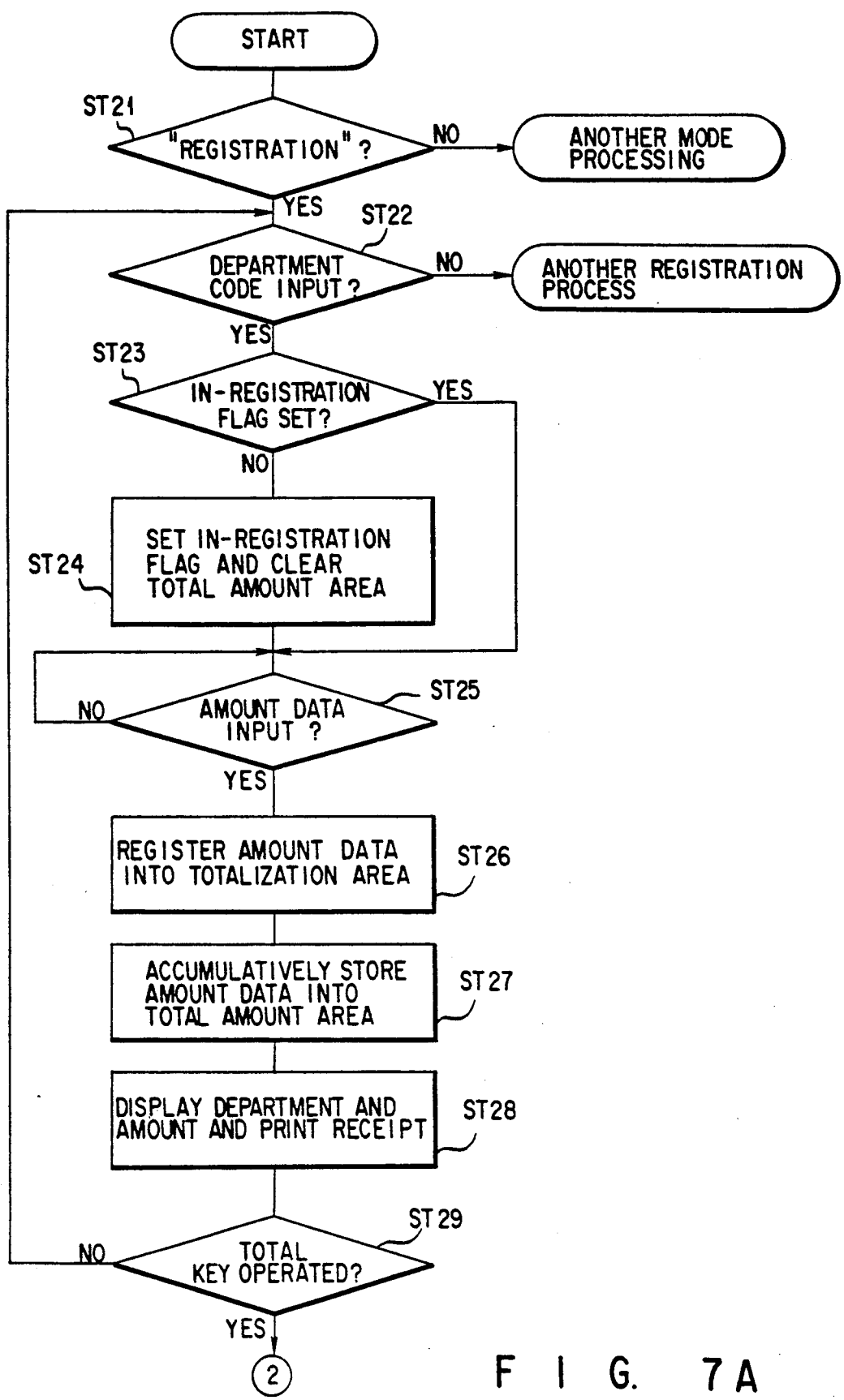
F I G. 7A

ELECTRONIC CASH REGISTER INDICATING WHEN CASH IS REQUIRED TO BE COLLECTED FROM THE CASH DRAWER

BACKGROUND OF THE INVENTION

1. Field of the Invention

This invention relates to an electronic cash register which generates a warning when the total amount of cash stored in a cash drawer becomes larger than a preset amount of money.

2. Description of the Related Art

There are some types of cash registers which always check the total amount of cash stored in the cash drawer thereof and generate a warning when the total amount of cash becomes equal to or larger than a predetermined upper limit. In this case, only one upper limit is set.

In stores using electronic cash registers, it is generally required to keep the total amount of cash stored in the drawer less than a minimum required amount since the possibility that the store is burglarized in the nighttime is high. However, when the upper limit is set to a small value according to the sales amount in the nighttime, the total amount of cash in the drawer will easily exceed the upper limit needed in the daytime during which a large number of customers will come to make purchases. Then, the manager must frequently collect the cash in the drawer. Therefore, one upper limit for the total amount of cash in the drawer is generally set according to the sales amount in the daytime.

SUMMARY OF THE INVENTION

An object of this invention is to provide an electronic cash register in which upper limits for the total amount of cash in the cash drawer can be selectively and automatically set according to a plurality of periods of time.

The above object can be attained by an electronic cash register comprising a cash drawer; means for generating total amount data indicating the total amount of cash stored in the drawer; means for storing upper limits of the total amount of cash to be received in the drawer for different periods of time; means for reading out the upper limit of the total cash amount for the current time from the upper limits of the total cash amount stored for respective periods of time in the storing means; means for comparing the upper limit of the total cash amount read out from the reading means with the total amount data generated from the generating means; and means for automatically generating a warning to request the collection of cash when the comparing means detects that the total amount data is not less than the upper limit of the total cash amount.

With the above electronic cash register, a warning for requesting the collection of cash is generated when the total amount data of cash stored in the drawer becomes equal to or larger than the upper limit of the total cash amount which is set for the period of time corresponding to the current time.

Therefore, in a store opening on the 24-hour system, for example, safety in the nighttime can be enhanced without causing any trouble in the daytime business by setting the upper limit to a small value in the nighttime and to a large value in the daytime.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram showing the circuit construction of the electronic cash register of FIG. 1;

FIG. 5 is a flowchart showing the process effected by a CPU shown in FIG. 3 for setting data into a preset area;

FIGS. 7A and 7B are flowcharts showing the process effected by the CPU shown in FIG. 3 for inputting data of a reserve supply of change.

DETAILED DESCRIPTION OF THE PREFERRED EMBODIMENTS

There will now be described an embodiment of this invention with reference to the accompanying drawings.

Figure 1:
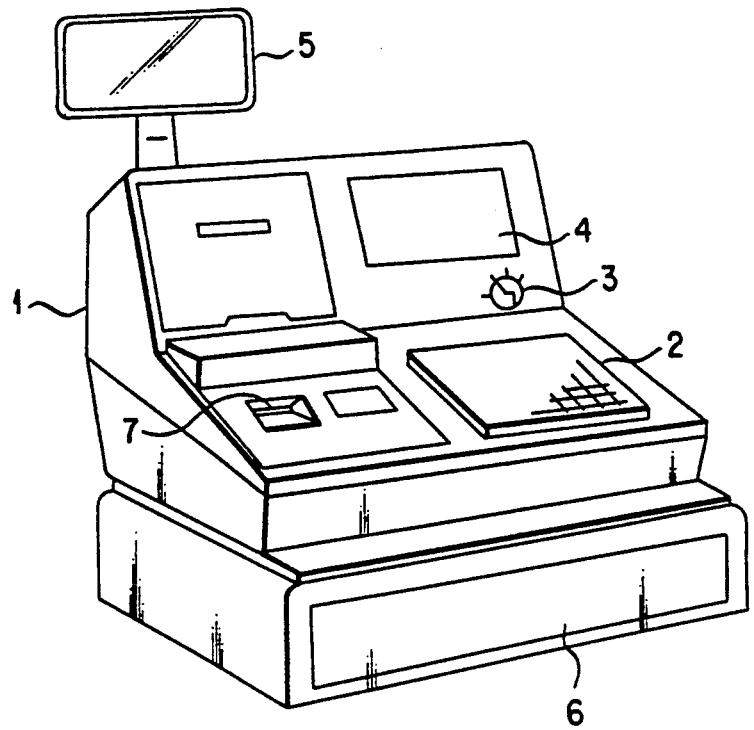
FIG. 1 is a perspective view of an electronic cash register according to one embodiment of this invention.

FIG. 1 shows the appearance of an electronic cash register 1. The electronic cash register 1 is installed as a POS (point of sales) terminal on the floor of a store opening on the 24-hour system, for example. The electronic cash register 1 includes a keyboard 2, mode switch 3, display unit 4 for cashier, display unit 5 for customer, and drawer 6.

The cashier puts cash prepared for change in the drawer 6. Further, the cashier puts cash received as the price of articles from a customer in the drawer 6.

The electronic cash register 1 has a printer provided therein and issues a receipt printed by the printer via a receipt outlet port 7.

Figure 2:
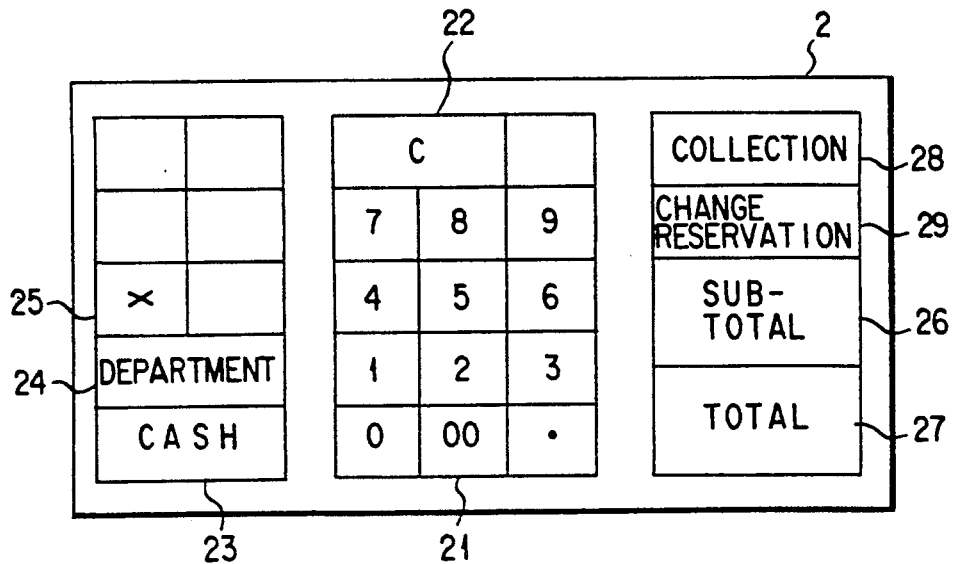
FIG. 2 is a plan view of a keyboard of the electronic cash register of FIG. 1.

FIG. 2 shows the key construction of the keyboard 2 in detail. The keyboard 2 includes twelve numeral keys 21, clear key 22, cash key 23, department key 24, multiplication key 25, sub-total key 26, total key 27, collection key 28 and change reservation key 29.

FIG. 3 is a block diagram showing the circuit construction of the electronic cash register 1. The electronic cash register includes a CPU (central processing unit) 31, ROM (read only memory) 32, RAM (random access memory) 33, timepiece 34, I/O port 35, communication interface 36, keyboard controller 37, display controller 38 and printer controller 39. The above circuit elements are connected to one another via a bus line 40.

The drawer 6 and a buzzer 41 are connected to the I/O port 35 and are operated according to control signals output via the I/O port 35. A signal from the mode switch 3 is input to the I/O port 35.

The keyboard controller 37 is connected to the keyboard 2. The display controller 38 is connected to the display unit 4 for cashier and the display unit 5 for customer. The printer controller 39 is connected to a printer 42 for printing data on receipt paper.

The timepiece 34 counts days, hours and the like. The days, hours and the like counted by the timepiece 34 are printed on the receipt.

The program data used by the CPU 31 for controlling the respective elements is previously stored in the ROM 32. Various memory areas or storing data to be processed by the CPU 31 are provided in the RAM 33.

Figure 4:
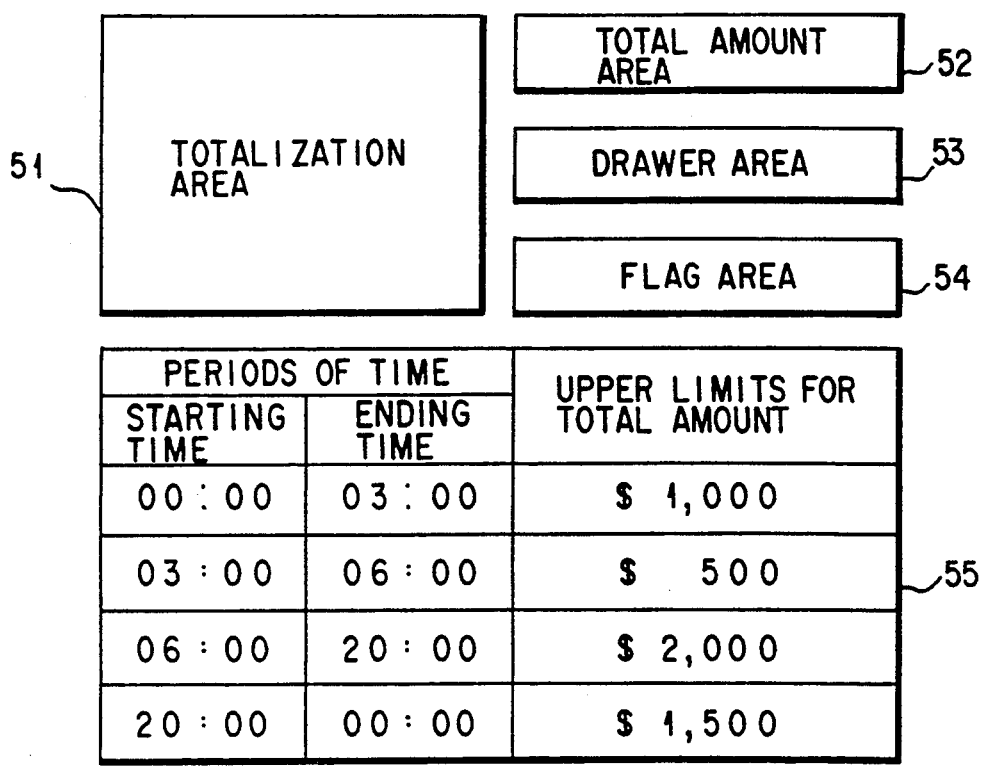
FIG. 4 is a memory map showing the main portion of a memory area formed in a RAM of FIG. 3.
Figure 6:
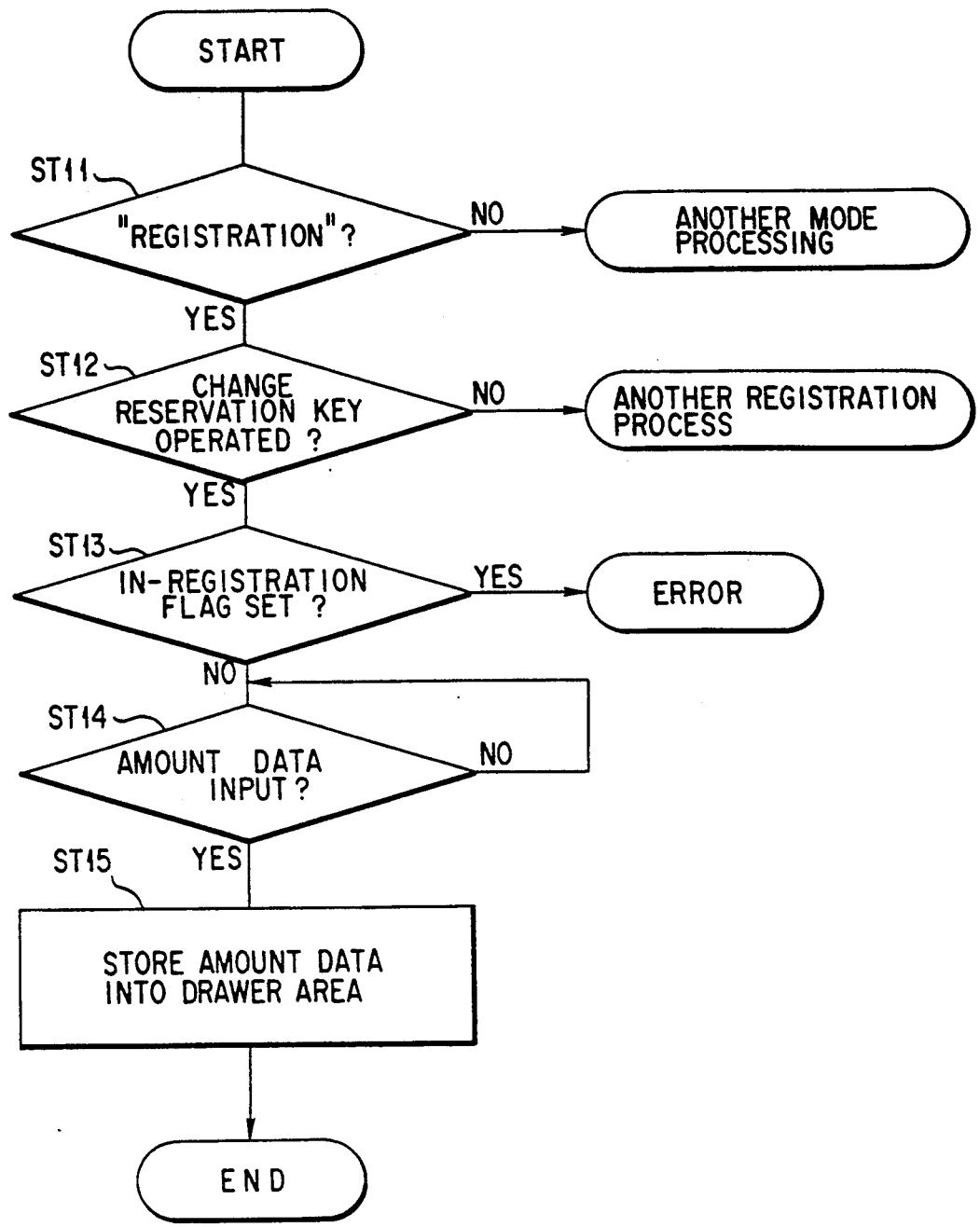
FIG. 6 is a flowchart showing the article registering process effected by the CPU shown in FIG. 3.

FIG. 4 shows the main portion of the memory areas provided in the RAM 33. The RAM 33 includes a totalization area 51 in which sales data items of respective articles sold and registered are totalized, a total amount area 52 for storing the total money amount of articles sold and registered for each transaction, a drawer area 53 for storing the total amount of cash stored in the drawer 6, a flag area 54 for storing an in-registration flag and a warning flag, and a setting area 55 for previously storing upper limits for the total amount of cash to be received in the drawer 6 for respective periods of time.

FIGS. 5 to 8 are flowcharts showing the main portion of the process effected by the CPU 31.

The operator inputs a code "99" by operating the numeral keys 21 with the mode switch 3 set in the "setting" mode. Then, the CPU 31 determines in the step ST1 shown in FIG. 5 that the mode switch 3 is set in the "setting" mode and determines in the step ST2 that the code "99" has been input. After this, the CPU 31 waits for 4-digit numeral data to be input by means of the numeral keys 21 in the step ST3. If the 4-digit numeral data is input in the step ST3, the numeral data is stored into the period starting time area of the setting area 55 in the step ST4.

The CPU 31 waits for 4-digit numeral data to be input by means of the numeral keys 21 in the step ST5. If the 4-digit numeral data is input in the step ST5, the numeral data is stored into the period ending time area of the setting area 55 in the step ST6.

The CPU 31 waits for cash data to be input by means of the numeral keys 21 and cash key 23 in the step ST7. If the cash data is input in the step ST7, the cash data is stored into the upper limit area of the setting area 55 in the step ST8.

After this, the CPU 31 repeatedly effects the process of the steps ST3 to ST8 by a plurality of times to set upper limits for the respective periods of time into the setting area 55. When the CPU 31 detects in the step ST9 that the key-in operation by the total key 27 is effected, the above process is completed.

The operator operates the change reservation key 29 with the mode switch 3 set in the "registration" mode. Then, the CPU 31 determines in the step ST11 of FIG. 6 that the mode switch 3 is set in the "registration" mode and detects in the step ST12 that the change reservation key 29 is operated. After this, the CPU 31 checks in the step ST13 whether the in-registration flag is set in the flag area 54 or not. When it is detected in the step ST13 that the in-registration flag is set in the flag area 54, it is determined that the key operation of the change reservation key 29 is error.

When it is detected in the step ST13 that the in-registration flag is not set in the flag area 54, the CPU 31 waits for cash data to be input by means of the numeral keys 21 and cash key 23 in the step ST14. If the cash data is input in the step ST14, the cash data is stored as an initial value into the drawer area 53 in the step ST15 and the process is completed.

The operator inputs the department code of a sales article by operating the numeral keys 21 and department key 24 with the mode switch 3 set in the "registration" mode. Then, the CPU 31 determines in the step ST21 of FIG. 7A that the mode switch 3 is set in the "registration" mode and detects in the step ST22 that the department code is input. After this, the CPU 31 checks in the step ST2 whether the in-registration flag is set in the flag area 54 or not. When it is detected in the step ST23 that the in-registration flag is not set in the flag area 54, the CPU 31 sets the in-registration flag and clears stored data of the total amount area 52 in the step ST24. When it is detected in the step ST23 that the in-registration flag is set, the CPU 31 jumps the process of step ST24.

The CPU 31 waits for cash data to be input by means of the numeral keys 21 and cash key 23 in the step ST25. If the cash data is input in the step ST25, the cash data is registered into the totalizing area 51 in the step ST26. After this, the CPU 31 adds the cash data to the stored data in the total amount area 51 in the step ST27. Then, the CPU 31 causes the input department code and cash data to be displayed on the display units 4 and 5 and causes them to be printed on the receipt by means of the printer 42 in the step ST28.

Figure 7B:
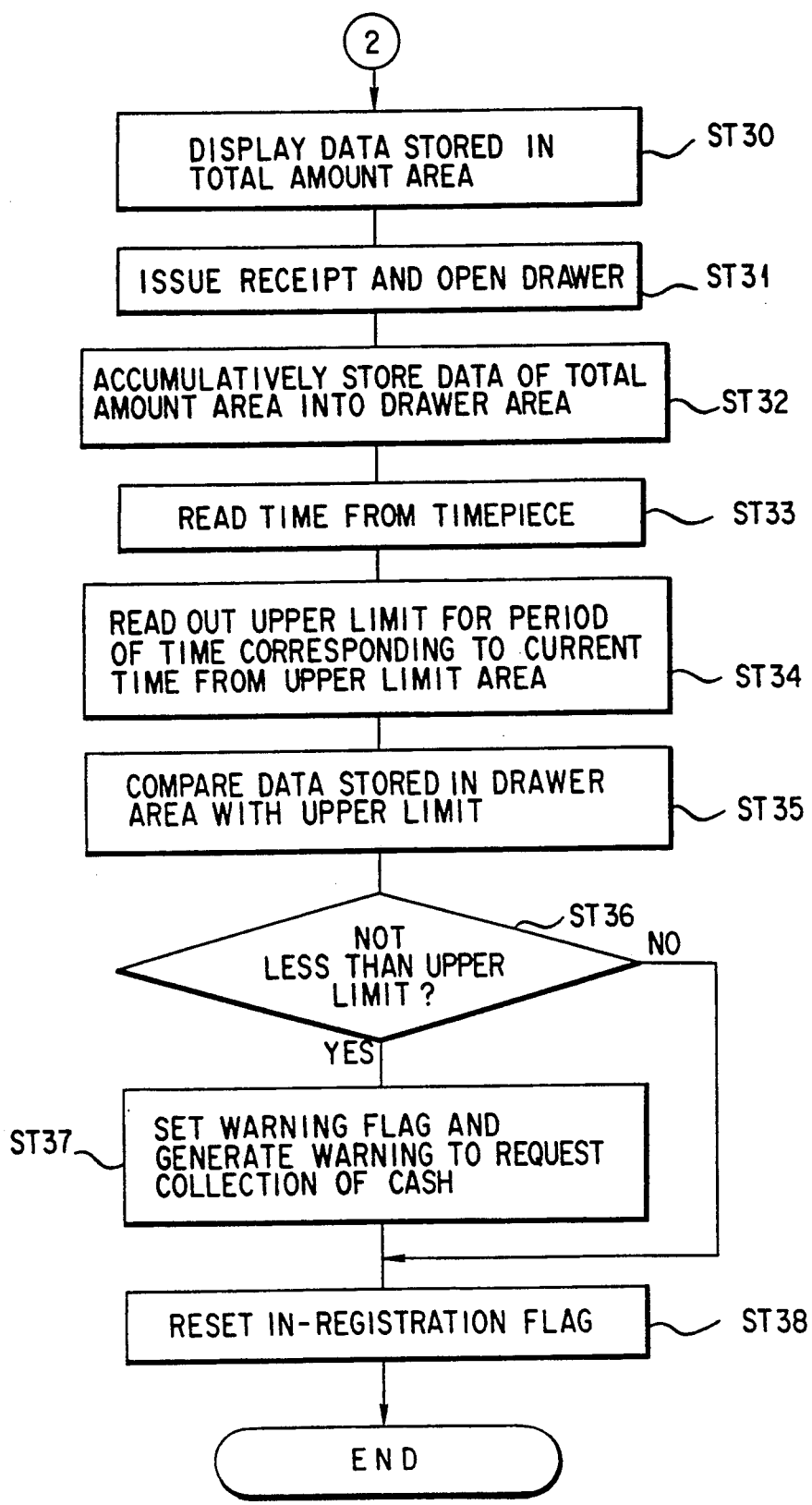
Figure 8:
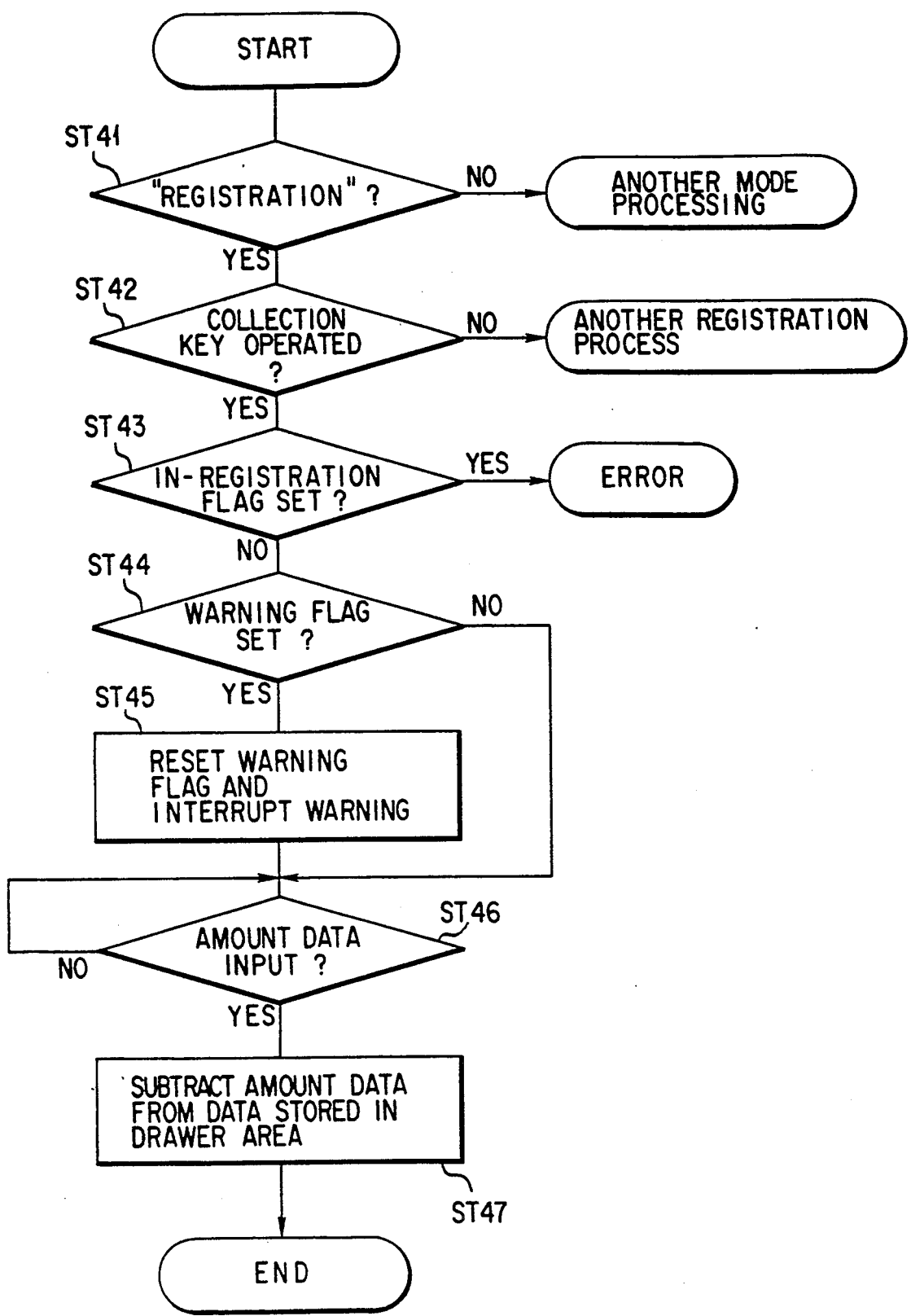
FIG. 8 is a flowchart showing the process effected by the CPU shown in FIG. 3 for inputting collected money data.

When it is detected in the step ST29 that the total key 27 is operated, the CPU 31 causes the total transaction amount stored in the total amount area 52 to be displayed on the display units 4 and 5 in the step ST30 shown in FIG. 7B. Then, the CPU 31 issues the receipt via the printer 42 and opens the drawer 6 in the step ST31.

The CPU 31 adds the stored data in the drawer area 53 to the total transaction amount stored in the total amount area 52 in the step ST32 and stores the result of addition into the drawer area 53.

The CPU 31 reads the current time counted by the timepiece 34 in the step ST33 and then reads out the upper limit corresponding to the current time from the setting area 55 in the step ST34. After this, the total amount data stored in the drawer area 53 is compared with the readout upper limit in the step ST35. If the comparison result indicates in the step ST36 that the total amount is equal to or larger than the upper limit, the CPU 31 sets the warning flag in the flag area 54 and displays the warning message for requesting the collection of cash on the display unit 4 for cashier in the step ST37. At this time, it is possible to sound the buzzer 41 to request the collection of cash.

The CPU 31 resets the in-registration flag in the flag area 54 in the step ST38 and completes the process.

The operator operates the collection key 28 with the mode switch 3 set in the "registration" mode. Then, the CPU 31 determines in the step ST41 shown in FIG. 8 that the mode switch 3 is set in the "registration" mode and detects in the step ST42 that the collection key 28 is operated. Then, the CPU 31 checks in the step ST43 whether the in-registration flag is set in the flag area 54 or not. When it is detected in the step ST43 that the in-registration flag is set, it is determined that the operation of the collection key 28 is error.

When it is detected in the step ST43 that the in-registration flag is not set, the CPU 31 checks in the step ST44 whether the warning flag is set in the flag area 54 or not. When it is detected in the step ST44 that the warning flag is set, the warning flag is reset in the step ST45 and the warning for requesting the collection of cash in the drawer 6 is interrupted. When it is detected in the step ST44 that the warning flag is reset, the CPU 31 jumps the process of step ST45.

The CPU 31 waits for cash data to be input by means of the numeral keys 21 and cash key 23 in the step ST46. If the cash data is input in the step ST46, the input cash data is subtracted from the stored data in the drawer area 53 in the step ST47. Then, the cash data obtained after the subtraction is stored into the drawer area 53 and the process is completed.

In a store using the electronic cash register 1 with the above construction, the manager previously selects the "setting" mode by use of the mode switch 3 to set the upper limits of total cash amount to be received in the drawer 6 for the respective periods of time. Then, the manager sequentially inputs data sets each containing the starting time and ending time of a period of time and a corresponding upper limit for the period of time via the keyboard 2. The thus set upper limits for the respective periods of time are stored into the setting area 55.

The cashier determines the total amount of cash received in the drawer 6 before starting the registration operation for articles purchased by a customer. The cash is prepared for change. The cashier selects the "registration" mode by use of the mode switch 3 and operates the change reservation key 29. After this, the cashier inputs the total amount of cash in the drawer 6 by means of the numeral keys 21 and cash key 23. Then, the input total amount of cash is stored into the drawer area 53.

After this, the cashier registers the sales data for the sold articles into the electronic cash register 1. The cashier operates the total key 27 each time the registration for articles purchased by one customer is completed.

When the total key 27 is operated, the total transaction amount for the customer is accumulatively stored into the drawer area 53. The customer pays cash corresponding to the total transaction amount. Therefore, data indicating the total amount of cash which is now received in the drawer 6 is stored in the drawer area 53.

Each time the total key 27 is operated, the current time counted by the timepiece 34 is read. Then, the upper limit corresponding to the current time is read out from the setting area 55. After this, the total amount data stored in the drawer area 53 and indicating the total amount of cash received in the drawer 6 is compared with the upper limit read out from the setting area 55. If the comparison result indicates that the total amount of cash becomes equal to or larger than the upper limit, a warning for requesting the collection of cash in the drawer 6 is generated.

As a result, the manager will collect the cash from the drawer 6.

At this time, the manager first operates the collection key 28. Then, the manager inputs the total amount data indicating the total amount of collected cash by use of the numeral keys 21 and cash key 23. When the above key operation is effected, the input collected cash amount data is subtracted from the stored data in the drawer area 53. As a result, the total amount data indicating the total amount of cash left in the drawer 6 after the collection of cash is stored in the drawer area 53.

As described above, according to this embodiment, when the total amount of cash received in the drawer 6 becomes equal to or larger than the upper limit set for a corresponding one of a plurality of periods of time, a warning for requesting the collection of cash in the drawer 6 is generated. The upper limits can be freely set for respective periods of time.

In a store opening on the 24-hour system, for example, it is required to store a large amount of cash as a reserve supply of change in the drawer 6 in the daytime since a large number of customers will come in the daytime. On the other hand, it is also required to store the least necessary amount of cash in the drawer 6 in the nighttime since there is a possibility that the store is burglarized in the nighttime. In such a store, the upper limit is set to a large value in periods of time corresponding to the daytime and to a small value in periods of time corresponding to the nighttime. With the upper limits thus set, control of the amount of cash in the drawer can be realized while satisfying the requirements of the store side.

In the above embodiment, the periods of time and the upper limits are freely set, but it is also possible to fixedly set the periods of time and freely set only the upper limits for the respective periods of time.

Further, the upper limits for the respective periods of time may be set as fixed data which cannot be freely changed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic cash register comprising:
a drawer for storing cash therein;
generating means for generating total amount data indicating a total amount of cash stored in said drawer;
storing means for storing different upper limits of a total cash amount to be received in said drawer for respective periods of time, said periods of time comprising at least one daytime time period and at least one nighttime time period, said upper limit for said at least one daytime time period differing from said upper limit for said at least one nighttime time period;
reading means for reading out from said storing means, an upper limit of the total cash amount for the current time which is included in a given time period, from the stored upper limits for the respective periods of time;
comparing means for comparing the upper limit of the total cash amount read out by said reading means with the total amount data generated by said generating means; and
warning means for automatically producing a warning to request a collection of cash when said comparing means detects that the total amount data is not less than the read out upper limit of the total cash amount.

2. An electronic cash register according to claim 1, wherein said generating means for generating total amount data indicating the total amount of cash stored in said drawer includes:

inputting means for inputting total amount data including a total amount of cash which is to be used for change in said drawer; and means for generating the total amount data input by said inputting means as an initial value.

3. An electronic cash register according to claim 1, wherein said generating means for generating total amount data indicating the total amount of cash stored in said drawer includes:

means for storing the total amount data;

inputting means for inputting total amount data indicating a total amount of cash collected from said drawer; and means for subtracting the total amount data input via said inputting means from the total amount data stored in said storing means, and for generating the result of substraction.

4. An electronic cash register according to claim 1, wherein said warning means comprises display means for producing a display for indicating that cash received in said drawer should be collected.

5. An electronic cash register according to claim 1, wherein said warning means comprises sounding means for producing a sound for indicating that cash received in said drawer should be collected.

6. An electronic cash register according to claim 1, further comprising means for selectively setting said periods of time.

7. An electronic cash register according to claim 6, further comprising means for selectively setting said upper limits for respective periods of time.

8. An electronic cash register according to claim 1, further comprising means for selectively setting said upper limits for respective periods of time.

9. An electronic cash register according to claim 1, wherein said at least one daytime time period comprises a plurality of different daytime time periods.

10. An electronic cash register according to claim 9, wherein said at least one nighttime time period comprises a plurality of different nighttime time periods.

11. An electronic cash register according to claim 1, wherein said at least one nighttime time period comprises a plurality of different nighttime time periods.

12. An electronic cash register comprising:

a drawer for storing cash therein;

generating means for generating total amount data indicating a total amount of cash stored in said drawer;

setting means for setting different upper limits of a total cash amount to be received in said drawer for respective periods of time, said periods of time comprising at least one daytime time period and at least one nighttime time period, said upper limit for said at least one daytime time period differing from said upper limit for said at least one nighttime time period;

storing means for storing upper limits of a total cash amount set for the respective periods of time by said setting means;

reading means for reading out from said storing means a upper limit of the total cash amount for the current time from the stored upper limits for the respective periods of time;

comparing means for comparing the upper limit of the total cash amount read out by said reading means with the total amount data generated by said generating means; and warning means for producing a warning to request a collection of cash when said comparing means detects that the total amount data is not less than the read out upper limit of the total cash amount.

13. An electronic cash register according to claim 12, wherein said setting means includes means for setting time period data.

14. An electronic cash register according to claim 12, wherein said at least one daytime time period comprises a plurality of different daytime time periods.

15. An electronic cash register according to claim 14, wherein said at least one nighttime time period comprises a plurality of different nighttime time periods.

16. An electronic cash register according to claim 12, wherein said at least one nighttime time period comprises a plurality of different nighttime time periods.

* * * * *